J. W. McKITRICK.
FASTENER.
APPLICATION FILED AUG. 13, 1908.
955,186.
Patented Apr. 19, 1910.
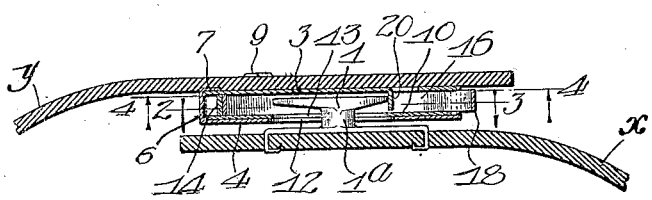
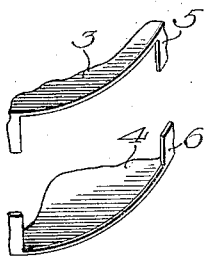
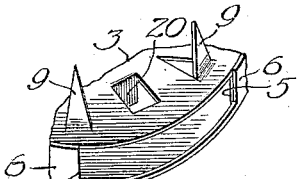
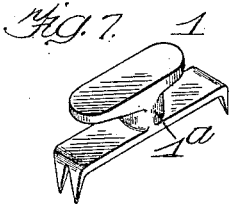
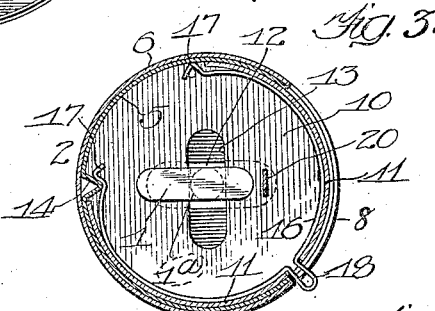
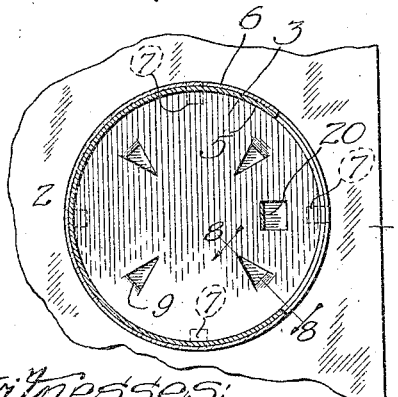
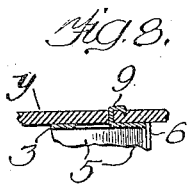
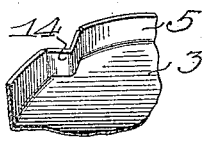
Witnesses:
Inventor
John W. McKitrick
By Luther L. Miller
Atty.

UNITED STATES PATENT OFFICE.

JOHN W. McKITRICK, OF MARSEILLES, ILLINOIS.

FASTENER.

955,186.         Specification of Letters Patent.       Patented Apr. 19, 1910.

Application filed August 13, 1908. Serial No. 448,299.

*To all whom it may concern:*

Be it known that I, JOHN W. McKITRICK, a citizen of the United States, residing at Marseilles, in the county of Lasalle and State of Illinois, have invented certain new and useful Improvements in Fasteners, of which the following is a specification.

The object of this invention is to provide an improved fastener adapted for use upon shoes, gloves, and the like, which shall be strong and simple in construction, which shall occupy very little space and which may be quickly and easily operated.

In the accompanying drawings, Figure 1 is a transverse section on an enlarged scale, through a fastener embodying the features of my invention, the view being taken on substantially the plane of line 1 1 of Fig. 2. Figs. 2 and 3 are sections on line 2 3 of Fig. 1. In Fig. 2 the fastener is shown in the open position and in Fig. 3 in the closed position. Fig. 4 is a section on dotted line 4 4 of Fig. 1. Fig. 5 is a fragmental perspective view of the two sections of the casing. Fig. 6 is a fragmental perspective view of said casing. Fig. 7 is a perspective view of one member of the fastener. Fig. 8 is a section on line 8 8 of Fig. 4. Fig. 9 is a fragmental perspective view of one section of the casing. Figs. 10 and 11 are fragmental perspective views of the rotatable locking disk.

The embodiment selected for illustration comprises a headed member 1, fixed to one of the parts to be united, and a socket or casing 2 having an opening to receive said headed member, said casing being secured to the other part to be united. In the construction herein shown, the casing 2 is formed from two disks 3 and 4, each having a peripheral flange 5 and 6, respectively, one of said flanges being adapted to fit within the other. To secure the disks 3 and 4 together, suitable means may be employed, such, for example, as lugs 7 upon the flange 6 overlying the disk 3. At one point, the flanges 5 and 6 are cut away to provide an opening 8 in one edge of the casing. Said casing is secured to one of the parts to be united by any suitable means, such as tangs 9 struck up from the disk 3 and adapted to be driven through the part to be connected and clenched. Within the casing 2 is a rotatable locking disk 10 having a peripheral flange 11. The casing 2 and the rotatable locking disk 10 have openings 12 and 13 therein adapted to register to permit the entrance of the headed member 1 and arranged to be thrown out of register to retain said headed member. Within the casing 2 is a projection 14 which may be conveniently formed by bending inwardly a portion of the flange 5. The flange 11 upon the locking disk 10 is cut away to form an extended opening 15 (Figs. 2, 3 and 11) to receive the projection 14.

In order to hold the fastener in either the closed or the open position, I preferably employ some such means as that shown in Figs. 1 and 2, said means consisting of a spring 16 having projections 17 upon its opposite ends, which projections are located within the extended opening 15. The spring 16 lies within the flange 11 of the locking disk 10 and moves with said disk. Suitable means is provided for rotating the locking disk; if desired the spring 16 may be utilized for this purpose, its central portion being bent into the form of a projection 18, which extends through a notch 19 in the flange 11 and through the opening 8 in the casing 2. The spring 16 is attached to the disk 10 by means of the portion 18 extending through the notch 19. The locking projections 17 are adapted to ride over the projection 14 for holding the locking disk in either of its two positions. When the disk 10 is locked, the projection 14 lies between one of the projections 17 and the adjacent end wall of the opening 15.

In order to prevent the headed member 1 from catching upon the casing 2 when the locking disk 10 is rotated to release the two members of the fastener, I may provide a stop 20 (Fig. 1) which may be formed integral with the disk 3, as shown, and which is so located as to prevent the head 1 from catching upon the adjacent end wall of the opening 12. The stop 20 also keeps the head 1 in a substantially central position with reference to the casing 2, so that the disk 10 may be rotated to close the fastener. Preferably, one side of the head 1 is shorter than the other, as indicated in Fig. 1, or, in other words, the neck 1ª is not centrally disposed with relation to the head. The pressure of the foot within the shoe (assuming the fastener is in use upon a shoe) tends to hold the shorter side of the head 1 against the stop 20; therefore the neck 1ª will not be in the center of the openings 12 and 13 until the disk 10 is rotated, when the wall of the opening 13 will force the head away from the stop 20, thus taking the strain off said stop.

When the fastener is to be used upon a shoe, the member 1 is preferably attached to the upper x and the casing 2 to the under side of the button piece y. The latter is secured to the upper by fitting the casing over the headed member 1 (Figs. 1 and 2) and turning the locking disk 10, by means of the projection 18, to throw the openings 12 and 13 out of register and thus confine the member 1 in the casing (Fig. 3). The disk 10 is locked in such position by the spring 16, as shown in Fig. 3. To unbutton the shoe the projection 18 is pushed to the opposite end of the opening 8, whereupon the casing 2 is free to be slipped off the headed member 1.

In practice there is generally sufficient tension upon the parts united by the fastener to cause the casing 2 to be withdrawn from the member 1 when the disk 10 is rotated to bring the openings 12 and 13 into register with each other. The stop 20 prevents the head from fouling on the outer end wall of the slot 12 while leaving the casing.

Referring to Fig. 1: When the fastener is opened, the tension upon the part y causes said part, with the casing 2, to spring upwardly and to the left, the stop 20 preventing the head 1 from catching on the outer end wall of the slot 12.

It will be seen that the device is very simple in construction; that it may be made quite small and thin so as to occupy but little space; and that it is easily and quickly operated.

I claim as my invention:

1. A fastening member comprising a casing, a rotatable flanged locking member in said casing, a spring lying within said flange, the ends of said spring projecting beyond the ends of said flange, and means attached to the casing adapted to be engaged by the ends of said spring, for locking said rotatable member against rotation.

2. A fastener member comprising a casing, a locking disk rotatably mounted in said casing, said disk having a flange thereon, a spring lying within the flange of said locking disk with its ends projecting beyond the ends of said flange, a portion of said spring projecting through an opening in said flange and through an opening in said casing and providing means for turning said locking disk, and locking means attached to the casing arranged to be engaged by the ends of said spring.

3. A fastener comprising a headed member, a casing having an opening for the entrance of the head of said headed member, a stop near said opening, and means in said casing to engage below the head of said headed member and force said head away from said stop.

4. A fastener comprising a headed member, a casing, a rotatable member in said casing, said casing and said rotatable member having openings therein arranged to register, and a stop near said openings, the head of said headed member being adapted to enter said openings and lie against said stop, said rotatable member when rotated being adapted to force said head away from said stop.

5. A fastener member comprising a casing consisting of two peripherally-flanged disks secured together; a locking disk rotatable within said casing, said disk having a flange thereon; a spring lying against the flange on said locking disk with the ends projecting beyond the ends of said flange, the central portion of said spring being bent to extend through a notch in said flange and through an opening in said casing, said locking disk and the adjacent wall of said casing having elongated openings arranged to register; a stop on the opposite wall of said casing near one end of said elongated openings; and a headed member arranged to extend into said openings and lie against said stop, said locking disk being adapted, when rotated, to force said head away from said stop.

JOHN W. McKITRICK.

Witnesses:
ARTHUR H. SIMMONS,
ERNEST S. GOODELL.